(12) United States Patent
O'Connor et al.

(10) Patent No.: US 8,099,570 B2
(45) Date of Patent: Jan. 17, 2012

(54) METHODS, SYSTEMS, AND COMPUTER PROGRAM PRODUCTS FOR DYNAMIC SELECTIVE MEMORY MIRRORING

(75) Inventors: James A. O'Connor, Ulster Park, NY (US); Kanwal Bahri, Hopewell Junction, NY (US); Daniel J. Henderson, Georgetown, TX (US); Luis A. Lastras-Montano, Cortlandt Manor, NY (US); Warren E. Maule, Cedar Park, TX (US); Michael Mueller, Leonberg (DE); Naresh Nayar, Rochester, MN (US); Richard Nicholas, Round Rock, TX (US); Eric E. Retter, Austin, TX (US); William J. Starke, Round Rock, TX (US); Michael R. Trombley, Cary, NC (US); Kenneth L. Wright, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1000 days.

(21) Appl. No.: 12/035,695

(22) Filed: Feb. 22, 2008

(65) Prior Publication Data

US 2009/0216985 A1 Aug. 27, 2009

(51) Int. Cl.
*G06F 12/00* (2006.01)
*G06F 13/00* (2006.01)
*G06F 13/28* (2006.01)

(52) U.S. Cl. ................ 711/162; 711/E12.001

(58) Field of Classification Search .............. None
See application file for complete search history.

(56) References Cited

U.S. PATENT DOCUMENTS

| | | | | |
|---|---|---|---|---|
| 5,530,820 A * | 6/1996 | Onodera | .......................... | 718/1 |
| 5,664,187 A | 9/1997 | Burkes et al. | | |
| 5,680,570 A * | 10/1997 | Rantala et al. | ................ | 711/113 |
| 5,893,919 A * | 4/1999 | Sarkozy et al. | ............... | 711/114 |
| 6,654,906 B1 * | 11/2003 | Arndt | .............................. | 714/11 |
| 6,684,292 B2 | 1/2004 | Piccirillo et al. | | |
| 6,961,727 B2 * | 11/2005 | McBrearty et al. | ................... | 1/1 |
| 7,254,741 B1 * | 8/2007 | Sardella et al. | ................ | 714/6.1 |
| 7,383,424 B1 * | 6/2008 | Olgiati et al. | ................ | 712/34 |
| 7,694,093 B2 * | 4/2010 | Shaw et al. | .................... | 711/162 |
| 7,711,911 B2 * | 5/2010 | Takahashi | ..................... | 711/162 |
| 2002/0082823 A1 * | 6/2002 | Traut | ............................. | 703/27 |
| 2002/0133681 A1 * | 9/2002 | McBrearty et al. | ........... | 711/165 |
| 2003/0088805 A1 | 5/2003 | Majni et al. | | |
| 2005/0122610 A1 * | 6/2005 | Ehrlich | ......................... | 360/55 |
| 2005/0125600 A1 * | 6/2005 | Ehrlich | ........................ | 711/112 |
| 2005/0125601 A1 * | 6/2005 | Ehrlich | ........................ | 711/112 |
| 2005/0125602 A1 * | 6/2005 | Ehrlich | ........................ | 711/112 |
| 2005/0125603 A1 * | 6/2005 | Ehrlich | ........................ | 711/112 |
| 2005/0125651 A1 * | 6/2005 | Ehrlich | ............................ | 713/2 |
| 2006/0085671 A1 | 4/2006 | Majni et al. | | |
| 2006/0218361 A1 * | 9/2006 | Ehrlich et al. | ................ | 711/154 |
| 2007/0094466 A1 * | 4/2007 | Sharma et al. | ................ | 711/162 |
| 2008/0195854 A1 * | 8/2008 | Choi | ................................ | 713/2 |
| 2009/0063836 A1 * | 3/2009 | Rothman et al. | .................. | 713/2 |
| 2009/0199017 A1 * | 8/2009 | Lange et al. | .................. | 713/194 |
| 2010/0037014 A1 * | 2/2010 | Lim et al. | ....................... | 711/105 |

OTHER PUBLICATIONS z/Architecture Principles of Operation, Sixth Edition (Apr. 2007), Publication No. SA22-7832-05, copyright IBM Corp. 1990-2007, Part 1 of 4. z/Architecture Principles of Operation, Sixth Edition (Apr. 2007), Publication No. SA22-7832-05, copyright IBM Corp. 1990-2007, Part 2 of 4.
z/Architecture Principles of Operation, Sixth Edition (Apr. 2007), Publication No. SA22-7832-05, copyright IBM Corp. 1990-2007, Part 3 of 4.
z/Architecture Principles of Operation, Sixth Edition (Apr. 2007), Publication No. SA22-7832-05, copyright IBM Corp. 1990-2007, Part 4 of 4.

* cited by examiner

*Primary Examiner* — Pierre-Michel Bataille
*Assistant Examiner* — Matthew Chrzanowski
(74) *Attorney, Agent, or Firm* — Cantor Colburn LLP; Williams A. Kinnaman, Jr.

(57) ABSTRACT

Methods, systems, and computer program products are provided for dynamic selective memory mirroring in solid state devices. An amount of memory is reserved. Sections of the memory to select for mirroring in the reserved memory are dynamically determined. The selected sections of the memory contain critical areas. The selected sections of the memory are mirrored in the reserved memory.

14 Claims, 6 Drawing Sheets

METHODS, SYSTEMS, AND COMPUTER PROGRAM PRODUCTS FOR DYNAMIC SELECTIVE MEMORY MIRRORING

BACKGROUND

Exemplary embodiments relate to memory systems and more particularly relate to methods, systems, and computer program products to recover from memory failures without the high overhead.

Memory mirroring or redundant array of independent disks (RAID) has been used in computer designs to improve overall computer system availability in hard disk drives (HDD).

Mirroring improves availability by storing two copies of the data, each a mirrored image of the other, so that in the event of a failure that data can be recovered by using the good mirrored copy. Accordingly, it is important to be able to detect and pinpoint data errors to know that a mirrored copy should be used. Mirroring is very powerful in that it enables a system to recover from even some fairly catastrophic memory failures. Recovery from full DIMM failure or from even failures of greater sections of the computer system memory can be achieved, so long as the computer system can detect and pinpoint the failure and the still functional part of the memory can be accessed to retrieve the data from the mirrored copy. If these conditions hold true, the computer system can recover from the failure and continue normal operation.

When some computer systems are designed to allow memory mirroring, the computer system is sometimes also designed with concurrent repair capability to avoid the down time associated with a scheduled repair. Without concurrent repair, a system with memory mirroring can survive many types of memory failures. However, the system has to be powered down at some point in time to replace the defective memory to restore the system to full capability. If a secondary memory fault is encountered before the repair that aligns with the first memory failure, the combination of both memory failures could take out both copies of the data and cause an unscheduled computer system outage. Systems designed with concurrent repair capability allow a failed section of memory to be replaced during run time, which is during normal system operation. Once the failed portion of memory is replaced, a mirrored copy of the data is rewritten to the new memory restoring the data copy and thus allowing the system to regain full recovery capabilities.

Nevertheless, as with most engineering problems, improving one system attribute, such as system availability, requires loosing capability or trading off capability in another area. Mirroring is no exception. The substantial availability gains that are realized with memory mirroring reduce the usable memory area by more than 50%. This is easy to see in that the mirrored copy of data requires that half of the available system memory space be used to hold the copy. In addition to the overhead to store the data copy, some mechanism to detect errors, know which copy has the error, and pinpoint the error is required. Many different detection mechanisms have been devised, such as detection bits, ECC (Error Correction Codes), or simple parity. These checker bits are associated with different, smaller sections of memory such as words or cache lines. The checksums are calculated across these smaller sections of memory and stored with the data. When the data is accessed, the checksums are recalculated and compared to the stored checksums. Normally, these schemes do not provide 100% detection of all bit pattern failure, but the detection accuracy is usually high. If the stored and recalculated checksums match, the data is assumed to be good; if they do not match, the data is assumed to be bad. In this way, most memory failures can be pinpointed and the mirrored copy of the data can be used to recover from the failure. Simply knowing that one copy of data does not match the other is insufficient. We also must know which mirrored copy contains the error, and thus, the usable memory area for mirroring is <50% of the physical memory capacity.

Computer system memory is still fairly expensive with a far higher cost per megabyte than hard disk drives (HDD), so memory mirroring when offered as a customer selectable feature has not been widely adopted. With a relatively high cost and total computer memory size continuing to grow, (single large computer system can now have over a terabyte of memory), it is not surprising that few if any customers elect to use memory mirroring as a feature.

Some companies have more recently begun to offer simple Reed-Solomon error correction schemes the can handle greater numbers of adjacent bit failures, but most of these cannot recover from a full dual in-line memory module (DIMM) failure. A DIMM is a thin rectangular card with several memory chips mounted on the cards. DIMMs are often designed with dynamic memory chips that need to be regularly refreshed to prevent the data it is holding from being lost. Unfortunately, as we continue to improve the overall performance of computer systems by pushing the limits of memory technology relative to bit density, access time, cost, and temperature, the likelihood of experiencing more catastrophic memory failures continues to increase proportionately.

In addition to simple Reed-Solomon error correction schemes, there are also RAID memory offerings that have been designed to handle a full DIMM failure. However, while not as significant as with mirroring, these schemes too can require a fairly large overhead. The impact to usable memory space can easily be 30% or more, and often flexibility is lost in that it can be difficult to have a common design that can be easily extended to accommodate changes in the underlying memory technologies as they change. As memory chips continue to evolve from DDR to DDR2 to DDR3, as x4 or x8 chips are used, and as cache line size varies, completely new RAID memory design may be required.

Another very important computer system attribute that can easily be overlooked is that not all memory failures are equal. Some memory failures may not matter at all if the portion of memory where the failure is experienced is not being used to store critical data. For example the memory might contain old data or that section of memory may just have not yet been used. The data stored in memory must be read to detect the error and there are scrubbing routines that do exactly that today. The scrubbing routines read unused sections of memory to attempt to detect and deal with memory faults before critical data is stored in these locations. Reading this unimportant data allows the error to be detected and dealt with before it holds critical information.

Other memory failures might impact just a single application program and thus may have only a minor impact to the full computer system operation. Large servers and mainframes, for example, may have hundreds of users with only a small number using a particular application in the specific section of memory where the memory fault is encountered. These types of memory faults do not impact the full set of users. In some cases, these errors may impact only a single user.

Still other memory failures might cause errors in a key application such as a data base application which could impact many or perhaps even all users. Other failures might take down an operating system and thus impact all the users associated with that operating system image. While still other failures, say in a large logically partitioned system for example, can take out multiple operating system images and might bring down the entire system affecting all applications and users.

Understanding the scope of the failure is important because recovering from the more minor errors might simply require the application to be rebooted which can be done without affecting the remaining running applications or users. The vast majority of users will have no indication that a failure has even occurred during the recovery process. On the other hand, if the entire system has to be rebooted, everyone is affected and if the database has to be restored, this can be a long time-consuming recovery process.

It would be beneficial to have methods, systems, and computer program products to recover from memory failures without the high overhead.

BRIEF SUMMARY

Exemplary embodiments include a memory system for dynamic selective memory mirroring in solid state devices. The system includes a memory controller and multiple memory modules in communication with the memory controller. An application is configured to reserve portions of the multiple memory modules as reserved memory. The application can dynamically determine sections to select of the multiple memory modules having critical areas. The application may mirror the selected sections of the multiple memory modules in the reserved memory.

Also, exemplary embodiments include a method for dynamic selective memory mirroring in solid state devices. An amount of memory is reserved. Sections of the memory to select for mirroring in the reserved memory are dynamically determined. The selected sections of the memory contain critical areas. The selected sections of the memory are mirrored in the reserved memory.

Further, exemplary embodiments include a computer program product, tangibly embodied on a computer readable medium, for dynamic selective memory mirroring in solid state devices. The computer program product includes instructions for causing a computer to execute the above method.

Additionally, exemplary embodiments include a method for dynamically determining critical areas for mirroring. Machine information is received. The machine information is analyzed for actual memory usage and logical partition configurations of the machine. The critical areas of the logical partitions which need to be mirrored in reserved memory are determined. The critical areas are mirrored in the reserved memory.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

Since not all memory failures are equal, exemplary embodiments provide techniques for very effective memory failure recovery using memory mirroring in a way that substantially reduces the overhead. Exemplary embodiments provide a far greater percentage of customer usable memory space over traditional memory mirroring in HDD. This can be accomplished by dynamic selective memory mirroring, which is protecting only the most critical memory areas with mirroring according to exemplary embodiments.

In addition, since critical memory may not exist as a single contiguous block of memory, exemplary embodiments can protect small non-contiguous areas of memory throughout the system by selectively and dynamically mirroring critical areas of memory.

Figure 1:
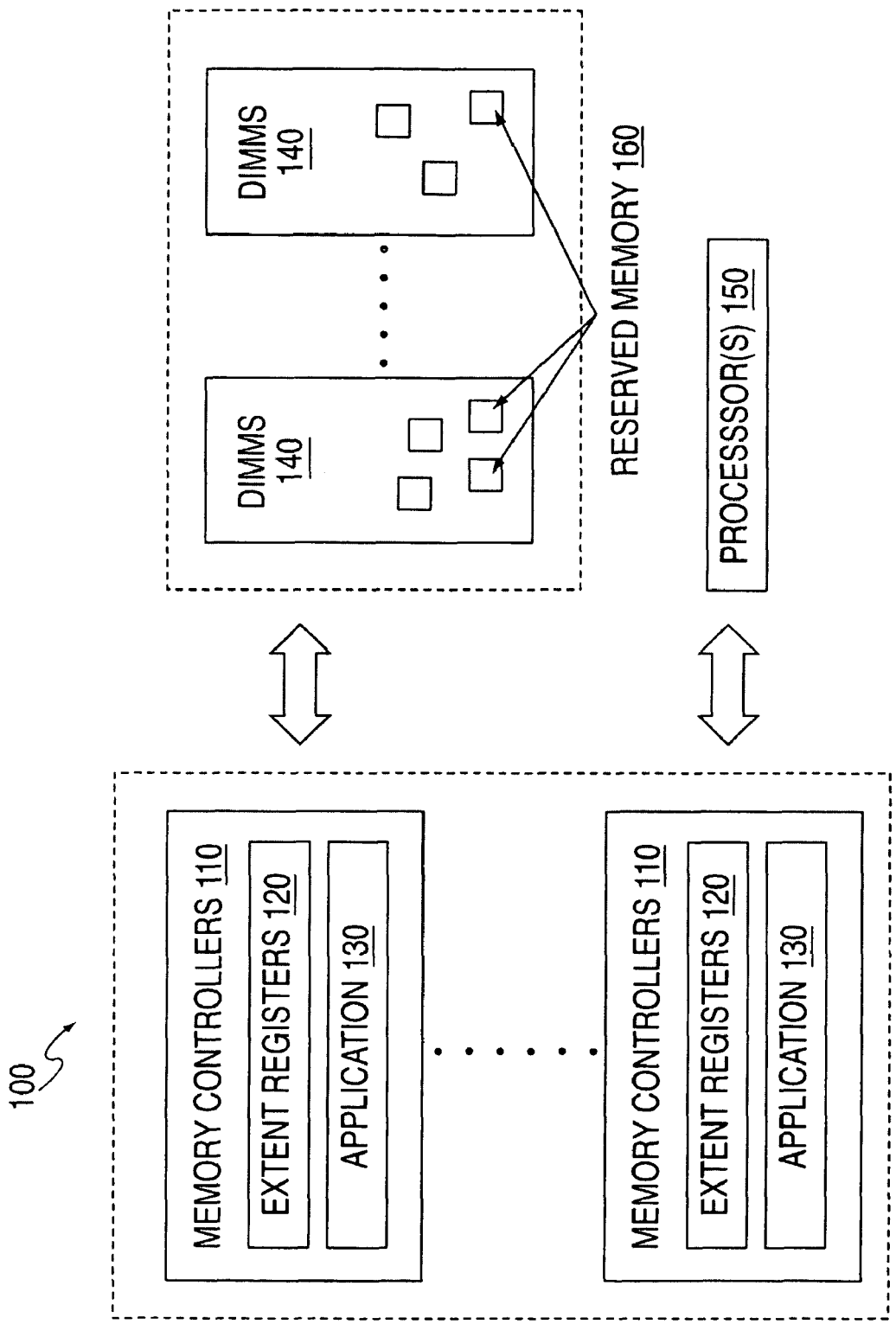
FIG. 1 illustrates a block diagram of a memory system in accordance with exemplary embodiments.

FIG. 1 illustrates a block diagram of a memory system 100 in accordance with exemplary embodiments. In the system 100, memory controllers 110 are configured to control multiple dual in-line memory modules (DIMMs) 140, respectively. The memory controllers 110 may be implemented on individual integrated circuit chips. The DIMMs 140 represent a plurality of individual dual in-line memory modules that may be, e.g., mounted on a printed circuit board. The DIMMs 140, e.g., may include a series of random access memory integrated circuits. For the sake of clarity all of the individual modules are not shown in FIG. 1. The small squares on the DIMMs 140 are to illustrate sections of reserved memory 160 in the DIMMs 140 in accordance with exemplary embodiments. Although not shown in FIG. 1 for the sake of clarity, there are a plurality of other sections of memory (similar to the small squares) in the DIMMs 140 which store data and are not reserved.

Extent registers 120 and application 130 may be implemented on each one of the memory controllers 110. Also, the extent registers 120 and application 130 are not required to be on the memory controllers 110 and may be located elsewhere in memory. For example, the extent registers 120 and/or the application 130 may be imbedded/incorporated into the processor architecture and design.

In accordance with exemplary embodiments, in the system 100, the application 130 is configured to provide transparent recovery for memory failures via dynamic selective memory mirroring. The application 130 may be software or firmware or a combination of both. The extent registers 120 are configured to specify which sections (blocks) of memory of the DIMMs 140 are to be mirrored. The mirroring granularity is determined by the number of extent registers 120 incorporated into the memory controller 110 hardware design, and the mirroring granularity may be below a DIMM 140 level or rank level. For example, the greater the number of extent registers 120, the finer the memory mirroring granularity that can be achieved for the DIMMs 140. For example, the minimum physical granularity for selective mirroring may be a single cache line access for a single rank in accordance with exemplary embodiments.

The application 130 can reserve contiguous or non-contiguous blocks of memory for selectively mirroring in the reserved memory 160. The extent registers 120 may store the addresses of the reserved sections of memory for the reserved memory 160, which are allocated to receive duplicate copies of sections of memory. When a user or the application 130 identifies a section of memory that should be mirrored (backed up with a duplicate copy), the application 130 copies the identified section(s) of memory from the DIMMs 140 into the reserved section(s) of memory (the reserved memory 160) in the DIMMs 140. The sections of memory to be copied may be located in various, non-contiguous blocks in the DIMMs 140. The memory controllers 110 retrieve the stored data from each block of memory to be copied and store a duplicate copy of each block in the reserved sections of memory of the reserved memory 160 in the DIMMs 140.

As non-limiting examples, the application 130 may search and locate critical code (such as hypervisor code) that is stored in the DIMMs 140, or the application 130 may receive input of the location of critical code that is stored in the DIMMs 140 from a user. The application 130 copies the critical code (which may be located in non-contiguous blocks of memory), and stores a duplicate copy of the critical code in the reserved memory 160. The extent registers 120 retain the location(s) in the DIMMs 140 of the original critical code, along with the locations(s) in the DIMMs 140 of the duplicated copy of the critical code. In the event of a memory failure to the original memory location(s) in the DIMMs 140 of the critical code, the extent registers 120 can be accessed to obtain the reserved memory 160 location(s) in the DIMMs 140 for the duplicated copy of the critical code.

Figure 2:
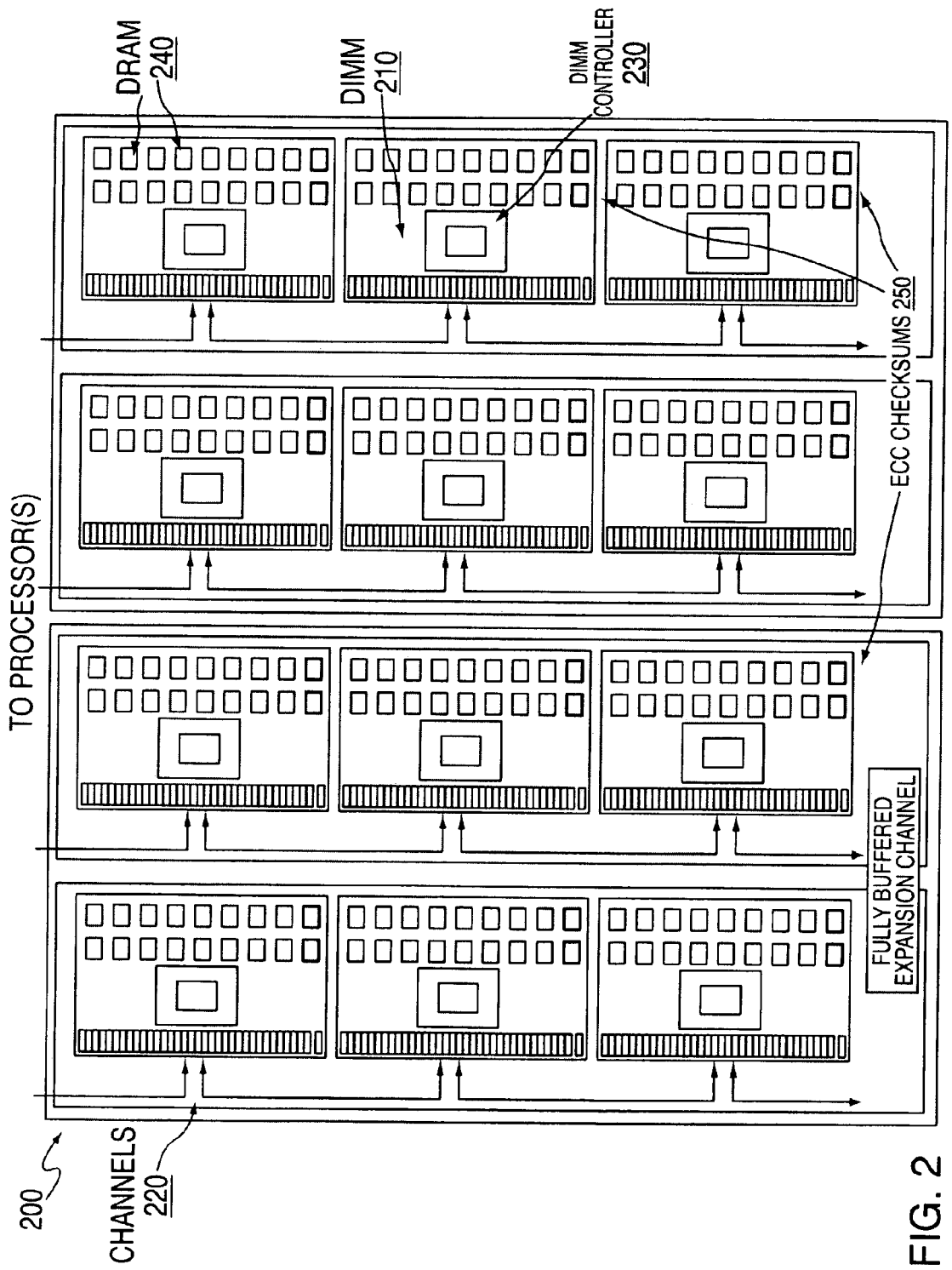
FIG. 2 illustrates a non-limiting example of an exemplary memory system for an IBM P7 server in which dynamic selective mirroring may be implemented in accordance with exemplary embodiments.

FIG. 2 illustrates a non-limiting example of an exemplary memory system 200 for an IBM P7 server in which dynamic selective mirroring may be implemented in accordance with exemplary embodiments.

In the P7 memory system 200, there are four memory channels 220 in two channel pairs across four DIMMs 210. During a memory read or write operation, a DIMM controller (or DRAM controller) 230 reads or writes data in two channels pairs by accessing two DIMMs 210 per channel. Mirroring across the two channels effectively reduces the usable memory space by half, but since mirroring can be done on a sub-DIMM boundary (across just a portion of the DIMM 210), the total customer usable memory area can remain high.

The DIMMs 210 may each include eighteen dynamic random access memories (DRAMs) 240. The bottom two DRAMS 240 on each DIMM 210 may be used as ECC checksums 250 for error detection and correction. In the memory system 200, each memory channel 220 may have three DIMMs 210. The DIMMs 210 each have the DIMM controller 230 that connects to the DRAMs 240 and one or more processors, such as processor 150. Although DRAMs 240 are illustrated on the DIMMs 210, any other type of solid state device can be used which has memory capabilities. Further, DIMM 210 is an exemplary example of an 18 DRAM x4 single rank DIMM, and it is understood that DIMM 210 is illustrated for explanatory purposes only and is not meant to be limiting in any way. For example, exemplary embodiments may also be implemented with 9 DRAM x8 single rank DIMMs. In addition, multi-rank DIMMs can be used. In fact, mixed capacity DIMMs can be selectively mirrored, where the mirroring would be limited by the lower capacity DIMM.

In the memory system 200, critical memory areas for power hypervisor (PHYP) code, which is for logical partitioning in P7, do not reside in contiguous memory locations in the DIMMs 210. The critical memory areas are scattered across the memory space in the DIMMs 210. Memory is dynamically allocated via logical memory blocks (LMBs), and as a non-limiting example, the smallest of which may be 16 MB and the largest may be 256 MB for P7. It would be better for dynamic selective mirroring to be accomplished on the smallest LMB to maximize the customer usable memory. However, the finer the granularity, the greater the complexity in DIMM controller 230 hardware and firmware to dynamically manage the allocation. The size of the granularity may be elected during the design process and is not meant to be limiting.

The critical memory area of each logical PHYP partition needs to be protected via dynamic selective mirroring from an unrecoverable memory error (UE), because a UE in the critical memory area can take down the entire computer system. The size of the memory area that needs to be protected is variable and dependent on a number of different configuration parameters. Typically, critical memory may be on the order of about 10% of the memory allocated for the respective partition containing the PHYP page table and other critical data.

Referring to FIG. 1, in accordance with exemplary embodiments, a high availability configuration analysis may be performed by the application 130 to assist customers in configuring their memory system 100 for the availability characteristics that they require for their particular application environment. The application 130 may analyze the specific memory system 100 configuration and customer requirements for the computer system (such as a server). The application 130 highlights critical memory areas that, if not mirrored, can have system wide impact. Using the application 130, customers may also elect to mirror specific application environments, such as a shared database application, that might have system wide impact if it goes down from encountering a UE.

Customers requiring higher availability of the reserved memory 160 may allocate more mirrored memory for the reserved memory 160 than what is initially provided. For example, a new logical partition may be added to the memory system 100 and there is not enough memory in the reserved memory 160 to mirror the critical sections of the new logical partition. The application 130 allows the memory system 100 to dynamically add additional reserved memory 160 and to dynamically mirror critical sections of the new logical partition in the DIMMs 140. Even if the customer requested the application 130 to mirror critical sections of the new logical partition and there was not sufficient, the application 130 is configured to dynamically allocate additional reserved memory 160 and to mirror the identified critical sections in the reserved memory 160. The application 130 communicates with the extent registers 120 for respective memory controllers 110 to retrieve the location of the reserved memory 160 and the blocks of data to be mirrored.

Figure 3A:
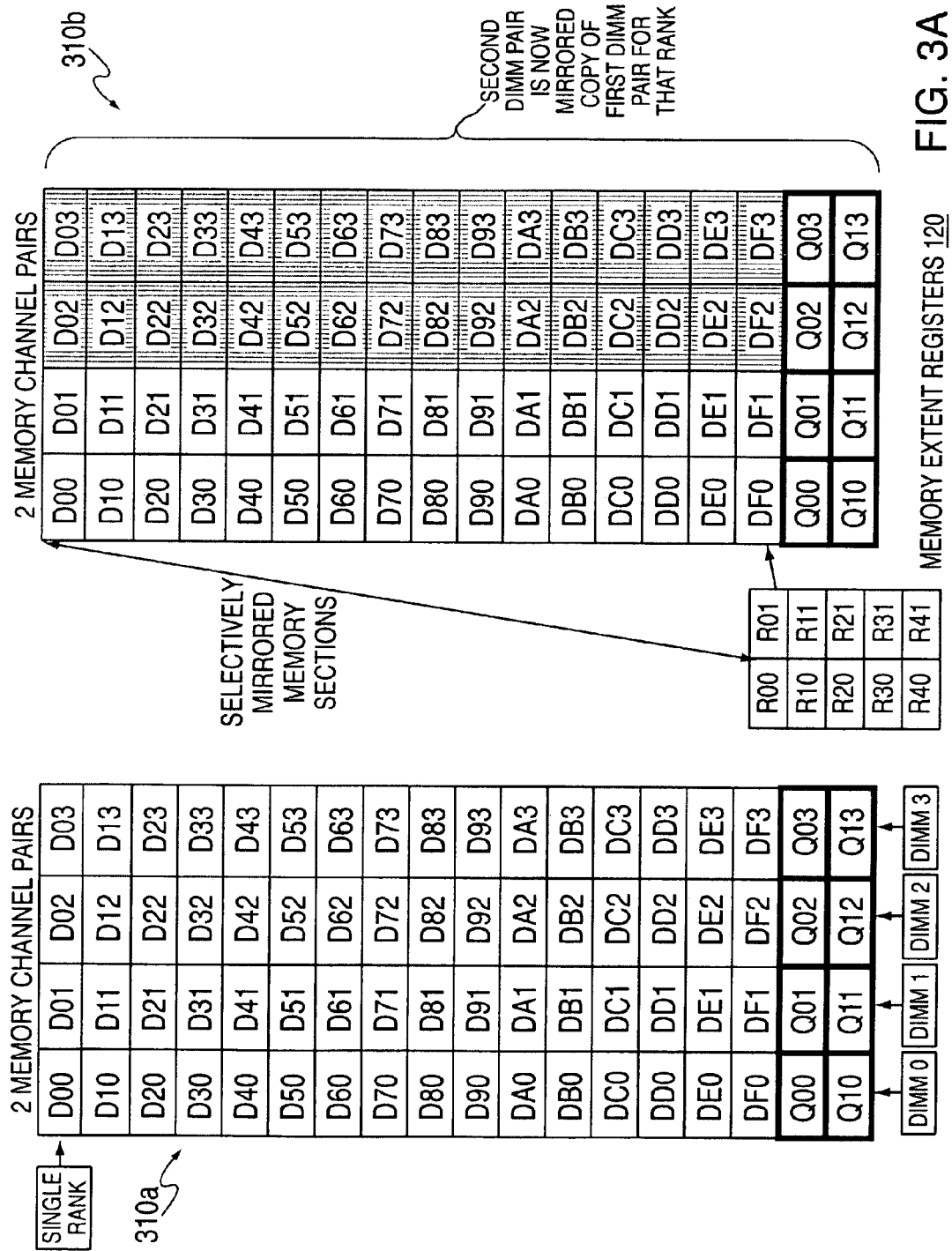
FIGS. 3A and 3B illustrate a logical representation of a memory system in accordance with exemplary embodiments.
Figure 3B:
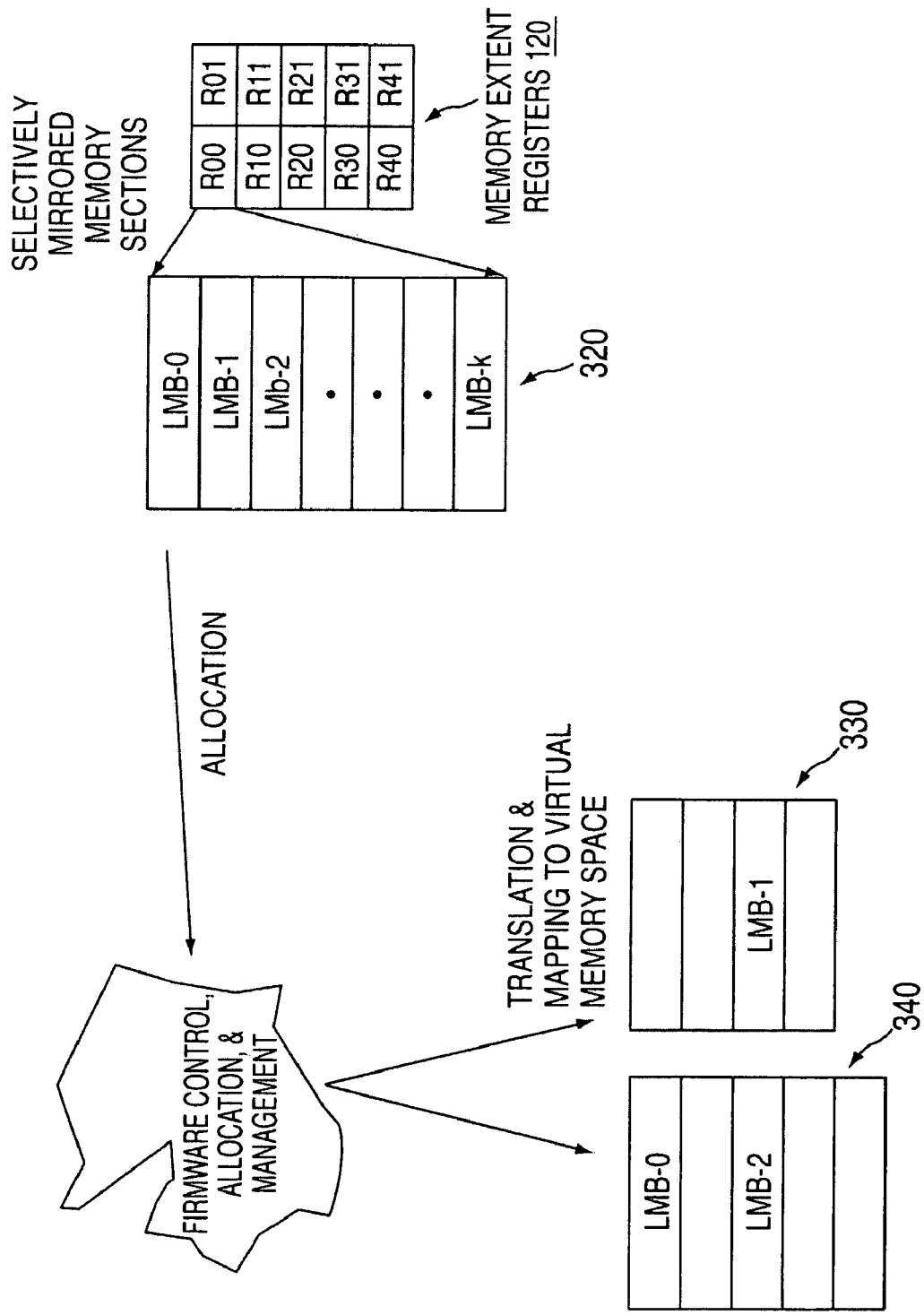

FIGS. 3A and 3B illustrate a logical representation of a memory system in accordance with exemplary embodiments. FIG. 3A illustrates two memory channels pairs as memory 310a and two memory channel pairs as memory 310b. Although memory 310a and memory 310b represent identical devices, memory 310a denotes a standard non-mirrored DIMM pair, while memory 310b denotes that certain memory sections have been selectively mirrored. Each Dxx cell may represent a DRAM chip on the DIMM. Also, in the memory extent registers 120, each Rxx may represent a register Rxx.

Both memories 310a and 310b have a first memory channel pair shown as DIMM 0 and DIMM 1 and a second memory channel pair shown as DIMM 2 and DIMM 3. The memories 310a and 310b illustrate a single rank DIMM.

The extent registers 120 contain the location of the selectively mirrored sections so that a mirrored copy can be accessed in the event of a UE. As can be seen in memories 310a and 310b, any section of memory can be mirrored in accordance with exemplary embodiments. The bottom two rows of the memories 310 and 320 may represent error correction sections.

FIG. 3B illustrates the mapping of LMB (Logical Memory Blocks) under firmware control (such as the application 130) to the virtual memory spaces used by logical partitions, operating systems, and applications. The physical memory 320 is contiguous in blocks LMB-0 through LMB-k. The translation and mapping to virtual memory is not restricted to being mirrored in contiguous blocks. Virtual memory 330 and 340 (reserved memory) show that the data in selected blocks of the memory 320 can be translated and mapped to non-contiguous blocks of virtual memory 330 and 340. The memory extent registers 120 define which ranks are mirrored into the virtual memory 330 and 340.

Figure 4:
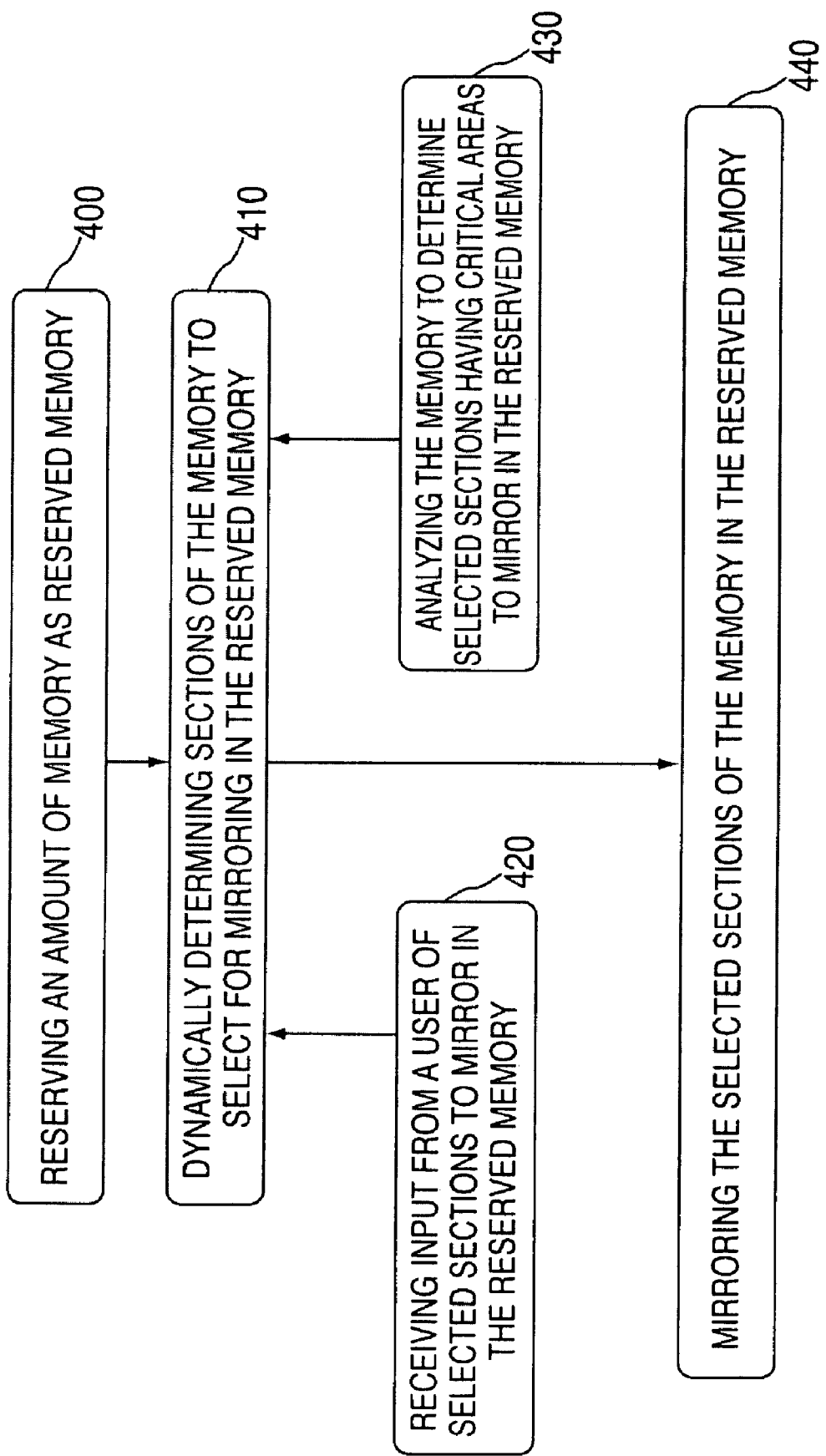
FIG. 4 illustrates a method of dynamic selective memory mirroring in accordance with exemplary embodiments.

FIG. 4 illustrates a method of dynamic selective memory mirroring in solid state devices in accordance with exemplary embodiments.

In accordance with exemplary embodiments, an amount of memory (e.g., of the DIMMS 140) is reserved as reserved memory 160 at 400. The reserved memory 160 is only a portion of the total memory of the DIMMs 140. A predefined amount of the memory may be reserved in advance as the reserved memory 160. The amount of reserved memory 160 may be increased or decreased as needed. For example, a user may increase/decrease the amount of reserved memory 160 and/or the application 130 may increase/decrease the amount of reserved memory 160.

Sections of the memory (of the DIMMs 140) to select for mirroring in the reserved memory 160 are dynamically determined at 410. The selected sections of the memory in the DIMMs 140 may contain critical areas that should be backed up in the reserved memory 160. A user may know critical areas (e.g., in a logical partition) that need to be backed up and these critical areas can be input into the application 130 at 420. Also, the application 130 may analyze the memory of the DIMMs 140 to determine critical areas that need to be mirrored in the reserved memory 160 at 430. For example, the application 130 may parse the memory of the DIMMs 140 for certain extensions, or the application 130 may parse the memory of the DIMMs 140 for certain applications that are shared among logical partitions.

The selected sections of the memory are mirrored in the reserved memory by the application 130 at 440. The selected sections of the memory may be non-contiguous blocks of memory of the DIMMs 140. Also, the selected sections may be mirrored in non-contiguous blocks of the reserved memory 160.

Further, in exemplary embodiments, the application 130 may parse the memory to locate hypervisor code, and the application 130 can identify the location of the hypervisor code as the selected sections of the memory to be mirrored.

The location (address) in memory of the selected sections to be mirrored is contained in the extent registers 120. Also, addresses of the reserved memory 160 are contained in the extent registers 120. The addresses of mirrored copies, which are duplicates of respective selected sections, are contained in the extent registers 120.

In response to the user creating a new logical partition in the memory of the DIMMs 140, the application 130 may dynamically determine sections of the new logical partition that contain critical areas. If the reserved memory 160 is not large enough to accommodate the critical areas of the new logical partition, the application 130 or the user may reserve more of the memory of the DIMMs 140 as the reserved memory 160. The application 130 mirrors the critical areas of the new logical partition in the reserved memory 160.

In accordance with exemplary embodiments, the selected sections of the memory may be mirrored in equal sized blocks in the reserved memory 160, and/or the selected sections of the memory may be mirrored in varied sized blocks in the reserved memory 160.

In response to detecting an error in the selected sections of the memory that have been mirrored, a mirrored copy in the reserved memory 160 is provided and the selected sections of the memory are concurrently repaired. For example, error correction code and/or error detection bits may be used to detect the error in the selected sections, and the mirrored copy from the reserved memory 160 can be read from and written to in place of the selected sections.

Figure 5:
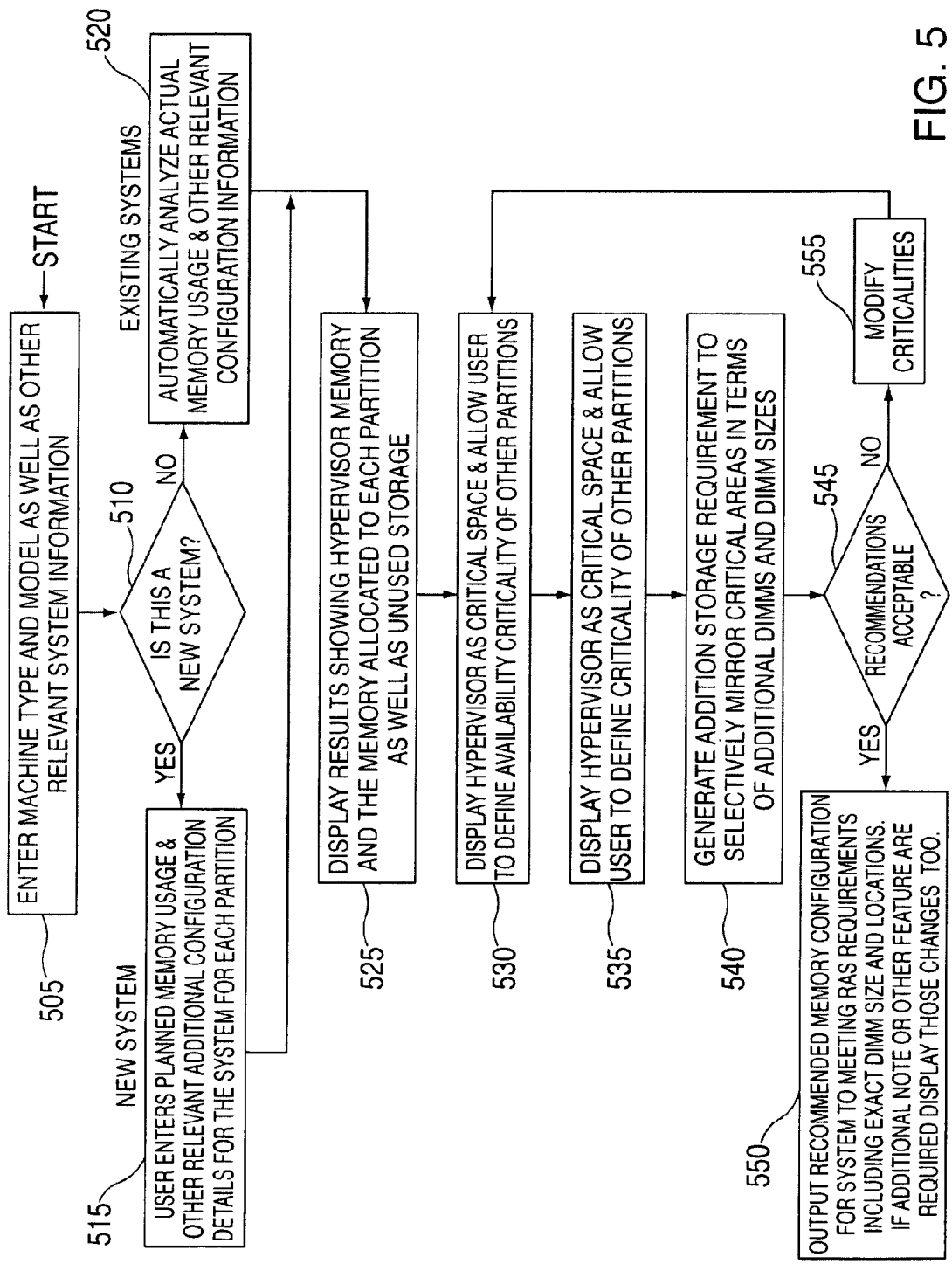
FIG. 5 illustrates a method for dynamically determining critical areas for mirroring in accordance with exemplary embodiments.

FIG. 5 illustrates a method for dynamically determining critical areas for mirroring in accordance with exemplary embodiments.

In accordance with exemplary embodiments, the machine type and model as well as other relevant system information may be entered into the application 130 at 505. For example, the machine may be an IBM Z series server. Other relevant system information may include details of the configuration (such as total memory capacity) and how the capacity is allocated across nodes. Also, other relevant information may include I/O adapters, network connections, operating system details (such as version information), and which applications are assigned to run in which logical partitions.

The application 130 may queries whether this is a new system at 510. If the user indicates that this is a new system, the user may enter a planned memory usage and other relevant additional configuration details for the system for each logical partition of the new system at 515.

If the user indicates that this is an existing system, the application 130 can automatically analyze actual memory usage and other relevant configuration information at 520.

The application 130 may display results showing hypervisor memory and the memory allocated to each partition as well as unused storage at 525.

The application 130 may display hypervisor code as critical space and allow a user to define criticality of other logical partitions at 530. For example, the user may create another logical partition that has hypervisor code. The location of this hypervisor code can be input by the user.

The application 130 may generate additional storage requirement to selectively mirror critical areas, in terms of additional DIMMs and DIMM sizes at 540. For example, there may not be enough reserved memory 160 an additional memory may need to be reserved.

The application 130 examines whether the recommendations for mirroring critical areas are acceptable at 545. As a non-limiting example, a parameter may be set that requires no more that 25% of the total memory be used as reserved memory for mirroring. If more reserved memory is needed, a user override is required. The parameter may be increased or decreased. Also, the reserved memory may be set to include a buffer over the amount of memory that is needed for mirroring; having such a buffer allows small dynamic modifications to the configuration.

If the recommendations are acceptable, the application 130 can output the recommended memory configuration for the system to meet RAS requirements including exact DIMM size and locations, and if additional notes or other features are required, the application 130 can output those changes too at 550.

If the recommendations are not acceptable, the application 130 may indicate that the criticalities need to be modified at 555. The process returns to operation 530 to allow the user to make adjustments.

As a non-limiting example, machine information may be received from a user or the application 130 may parse the machine to obtain information relating to the machine. The machine, e.g., may be a server having numerous processors and a large memory (e.g., DIMMs).

The machine information may be analyzed by the application 130 for actual memory usage and logical partition configurations of the machine. Critical areas of the logical partitions which need to be mirrored in reserved memory may be determined by the application 130. Also, a user may input critical areas. The critical areas are mirrored in the reserved memory by the application 130. If additional critical areas are determined (e.g., by the user), the application 130 may examine whether sufficient reserve memory is available. If not, the application 130 or the user may elect to add more reserve memory.

Further, although the application 130 has been discussed herein, it is understood that the application 130 may be representative of multiple applications each having capabilities to implement dynamic selective memory mirroring in accordance with exemplary embodiments. The application 130 may reside on, e.g., the machine (e.g., an IBM Z series server) having critical areas that are to be mirrored. Also, the application 130 may reside on a remote server that communicates with the machine. Further, the application 130 may be implemented in a client-server architecture. A client application may reside on the machine and a server application may reside on a back-end server. The client application and the server application may interact to implement dynamic selective memory mirroring in exemplary embodiments.

Additionally, the application 130 may have a graphical user interface (GUI) in which the user interacts. For example, the GUI may have boxes in which the user can input information, and the GUI may display information to the user.

In accordance with exemplary embodiments, technical effects and benefits provide an adaptable memory system that can recover dynamically from memory errors without requiring the high overhead. By using the dynamic selective memory mirroring for the sections of memory that are mirrored (such as hypervisor critical areas), exemplary embodiments enable the computer system (such as a server) to continue to run unimpaired providing full access to all data stored in RAM just as when all the memory nodes are present, powered-on, and fully operational. For areas of memory that are not mirrored, normal ECC will continue to correct relatively minor multi-bit errors. However, for more catastrophic memory failures that result in UEs, dynamic selective mirroring is necessary to protect that specific area of the memory system from an encountered UE. As long as the non-mirrored memory is associated with less critical data and applications, only a small portion of the total computer system may be affected by the error. In many cases, the data and applications associated with the failed portion of memory can be recovered and restarted without rebooting the entire computer system by using other free sections of the computer memory. Furthermore, in these cases other users of the system will be completely unaffected by the memory failure.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage; medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc., do not denote any order or importance, but rather the terms first, second, etc., are used to distinguish one element from another.

The invention claimed is:

1. A memory system for dynamic selective memory mirroring in solid state devices, comprising:
   a memory controller;
   a plurality of memory modules in communication with the memory controller;
   an application configured to reserve portions of the plurality of memory modules as reserved memory;
   wherein the application dynamically determines selected sections to select of the plurality of memory modules having critical areas by:
      parsing the plurality of memory modules to locate hypervisor code as the critical areas for mirroring; and
      identifying the location of the hypervisor code as the selected sections to be mirrored in the reserved memory; and
   wherein the application mirrors the selected sections of the plurality of memory modules in the reserved memory;
   wherein the location of the hypervisor code mirrored in the reserved memory is specified in extent registers such that a mirroring granularity is determined by a number of the extent registers.

2. The memory system of claim 1, wherein a predefined amount of memory of the plurality of modules is reserved in advance as the reserved memory.

3. The memory system of claim 1, wherein creating a new logical partition of the plurality of modules causes the application to dynamically determine sections of the new logical partition that contain the hypervisor code being the critical areas;
   wherein if the reserved memory is not large enough to accommodate the hypervisor code being the critical areas of the new logical partition, the application reserves more of the plurality of modules as the reserved memory; and
   wherein the application mirrors the hypervisor code being the critical areas of the new logical partition in the reserved memory.

4. The memory system of claim 1, wherein:
the selected sections of the plurality of modules are mirrored into varied sized blocks in the reserved memory; and
the selected sections of the plurality of modules are mirrored in non-contiguous logical memory blocks.

5. The memory system of claim 1, wherein in response to detecting an error in the selected sections of the memory that have been mirrored, a mirrored copy in the reserved memory is provided and the selected sections of the memory are concurrently repaired.

6. A method for dynamic selective memory mirroring in solid state devices, comprising:
reserving an amount of memory as reserved memory;
dynamically determining selected sections of the memory to select for mirroring in the reserved memory by:
parsing the plurality of memory modules to locate hypervisor code as the critical areas for mirroring; and
identifying the location of the hypervisor code as the selected sections to be mirrored in the reserved memory;
wherein the selected sections of the memory contain critical areas; and
mirroring the selected sections of the memory in the reserved memory;
wherein the location of the hypervisor code mirrored in the reserved memory is specified in extent registers such that a mirroring granularity is determined by a number of the extent registers.

7. The method of claim 6, wherein a predefined amount of the memory is reserved in advance as the reserved memory.

8. The method of claim 6, wherein in response to creating a new logical partition of the memory, dynamically determining sections of the new logical partition that contain critical areas;
if the reserved memory is not large enough to accommodate the critical areas of the new logical partition, reserving more of the memory as the reserved memory; and
mirroring the critical areas of the new logical partition in the reserved memory.

9. The method of claim 6, wherein the selected sections of the memory are mirrored in equal sized blocks in the reserved memory.

10. The method of claim 6, wherein the selected sections of the memory are mirrored in varied sized blocks in the reserved memory.

11. The method of claim 6, wherein in response to detecting an error in the selected sections of the memory that have been mirrored, a mirrored copy in the reserved memory is provided and the selected sections of the memory are concurrently repaired.

12. The method of claim 6, wherein addresses of the selected sections of the memory are contained in the extent registers;
wherein addresses of the reserved memory are contained in the extent registers; and
wherein addresses of a mirrored copy, being a duplicate of the selected sections stored in the reserved memory, are contained in the extent registers.

13. The method of claim 6, wherein the reserved memory is an allocated portion of the memory; and
wherein the reserved memory is for mirroring the selected sections of the memory.

14. A computer program product, tangibly embodied on a non-transitory computer readable medium, for dynamic selective memory mirroring in solid state devices, the computer program product including instructions for causing a computer to execute a method, comprising:
reserving an amount of memory as reserved memory;
dynamically determining sections of the memory to select for mirroring in the reserved memory by:
parsing the plurality of memory modules to locate hypervisor code as the critical areas for mirroring; and
identifying the location of the hypervisor code as the selected sections to be mirrored in the reserved memory;
wherein the selected sections of the memory contain critical areas; and
mirroring the selected sections of the memory in the reserved memory;
wherein the location of the hypervisor code mirrored in the reserved memory is specified in extent registers such that a mirroring granularity is determined by a number of the extent registers.

* * * * *